W. F. BARNES.
BASKET MAKING MACHINE.
APPLICATION FILED JAN. 15, 1908.

934,877.

Patented Sept. 21, 1909.
10 SHEETS—SHEET 3.

Fig. 3.

WITNESSES:

INVENTOR
Willard F. Barnes
BY Geo. H. Strong
ATTORNEY

W. F. BARNES.
BASKET MAKING MACHINE.
APPLICATION FILED JAN. 15, 1908.

934,877.

Patented Sept. 21, 1909.
10 SHEETS—SHEET 6.

WITNESSES:

INVENTOR

BY

ATTORNEY

W. F. BARNES.
BASKET MAKING MACHINE.
APPLICATION FILED JAN. 15, 1908.

934,877.

Patented Sept. 21, 1909.
10 SHEETS—SHEET 10.

WITNESSES:
F. Eastberg
J. A. Innes

INVENTOR
Willard F. Barnes
BY Geo. H. Strong,
ATTORNEY

UNITED STATES PATENT OFFICE.

WILLARD F. BARNES, OF SAN FRANCISCO, CALIFORNIA, ASSIGNOR TO W. F. BARNES COMMERCIAL CO., OF SAN FRANCISCO, CALIFORNIA, A CORPORATION OF CALIFORNIA.

BASKET-MAKING MACHINE.

934,877.  Specification of Letters Patent.  Patented Sept. 21, 1909.

Application filed January 15, 1908. Serial No. 410,953.

*To all whom it may concern:*

Be it known that I, WILLARD F. BARNES, a citizen of the United States, residing in the city and county of San Francisco and State of California, have invented new and useful Improvements in Basket-Making Machines, of which the following is a specification.

My invention relates to an apparatus which is designed for the manufacture of baskets such as are formed by crossing thin veneers transversely, bending them to form the sides, then applying a metallic binding strip around the top edges to hold the whole together.

It consists of mechanism whereby the veneer sheets are assembled, bent into shape, the metallic rim applied around the top and the basket completed and discharged.

It also comprises details of construction which will be more fully explained by reference to the accompanying drawings, in which—

Fig. 12 is a section of the lower part of the central frame, and the stationary guide. Fig. 13 shows the vacuum shoes and supporting frame.

The main part of the apparatus is supported upon a suitable frame structure or table, as indicated at C.

Upon the table surface is fixed a mold or former A which consists of a heavy block of metal, in the present case shown rectangular in cross section having the part which is uppermost, corresponding in size and shape to the bottom of the proposed basket, and the lowermost portion is of sufficiently larger area to provide for the divergent or flaring sides of the basket when finished. Above this former is a depressible plate 2 having a stem $2^a$ extending down into the mold or former A, and surrounded by a spiral spring 3 which normally holds the plate above the surface of the part A, which surface corresponds to the bottom of the proposed basket.

Guides $2^b$ are slidable in vertical openings in the former at each side of the central stem, and these serve to steady the former in its movements up and down.

In line with the mold or former and directly above it is a rectangular frame B of such size and shape that when it is depressed it will fit over the mold A and will thus act to fold the ends of veneers which have been previously placed in position above the mold so that the veneers will substantially fit the sides of the mold.

The rectangular frame B is carried by the vertical slide 4 as shown.

The sides 5 of the frame B are hinged and forced inwardly by springs $5^a$, the object of which will be explained hereafter.

When the frame B is forced down by the downward movement of the slide, it folds the ends of the veneers against the sides of the mold. The movement still continuing, it then depresses the part 2, and the lower edges of the veneers are caused to slide down the sides of the mold until they enter the grooves of the V-shaped tin strips 30 which have been previously placed and bent around the bottom of the former.

After the insertion of the edges of the basket into the binding strips, the latter are compressed or crimped upon the edges of the veneers, and the basket is then finished and ready for removal from the mold.

The placing of the veneers above the mold, and the manner of removing the finished basket is accomplished in the following manner: D is a horizontally revoluble table mounted on a sleeve 6, shown in Figs. 9 and 12. This sleeve revolves upon a stationary hollow shaft 7. The sleeve is held in position by a collar 8. On the lower end of the sleeve is a four-point ratchet clutch 9 which is acted on to revolve the table one-quarter of a revolution at a time. The clutch arm $9^a$ is connected through a link 10 with a horizontally mounted crank-arm 11 on shaft $14^a$; this in turn is connected through a lower crank-arm $11^a$ as shown at 12, with an eccentric 13 on the main shaft 14, so that at each revolution of the main shaft, the clutch moves the table one-quarter of a revolution. The revoluble table B carries four holders 15, $15^a$, $15^b$, $15^c$. These holders receive the veneers and place them in position above the mold. They also serve the function of receiving the finished basket, and placing it in a position where it may be discharged from the machine. These holders consist of rectangular forms which have tapering sides, as shown at 16, Figs. 9, 13, 20, 21.

Figure 9:
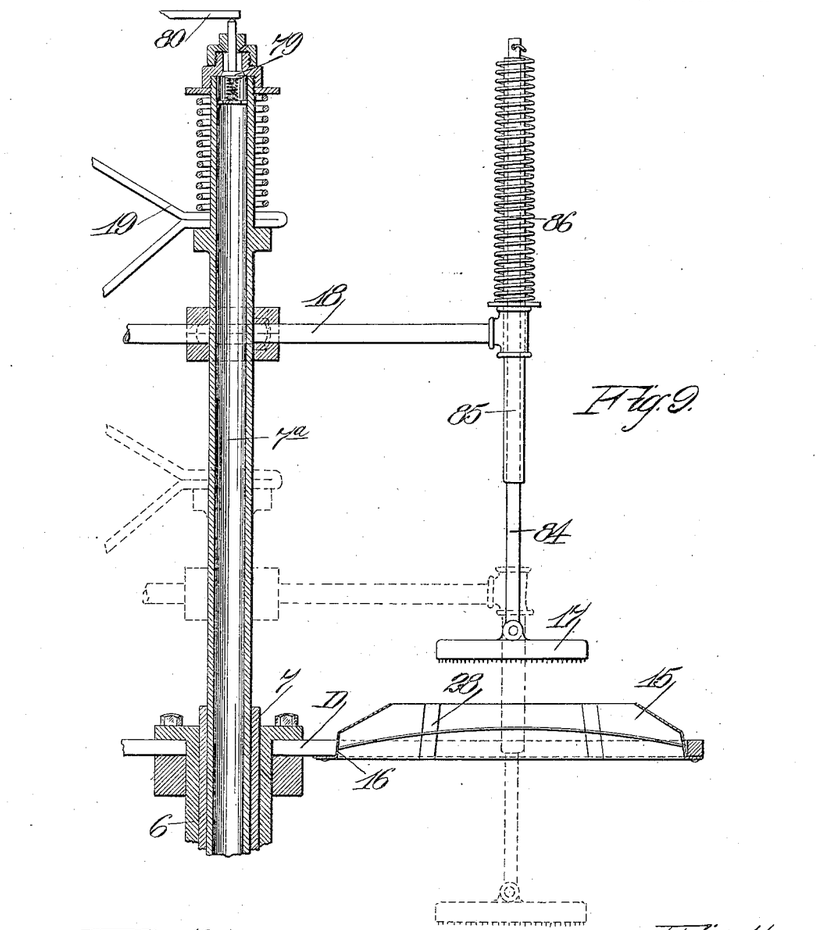
Fig. 9 is a section of the upper part of the central frame, also showing the pin covered shoe, and connecting frame.
Figure 10:
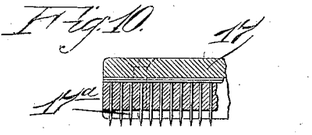
Fig. 10 is a section of part of the shoe showing its construction.
Figure 11:
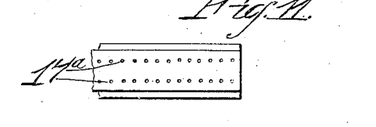
Fig. 11 is a bottom view of same.

The veneers are placed in the holder in the following manner: 17 is a shoe which is supported from a frame as at 18 Fig. 9. The lower surface of the shoe is provided with small pin points that may be fixed therein in any suitable manner as at $17^a$. Any suitable number of these pins, and any desired disposition of them may be made for the purpose for which they are to be used.

The frame 18 is connected through an arm 19 with the vertical slide 4. The central portion of the frame is mounted on the hollow tube $7^a$, which in turn is slidable within the hollow shaft 7, thus guiding and steadying the frame in its upward and downward movements.

Figure 20:
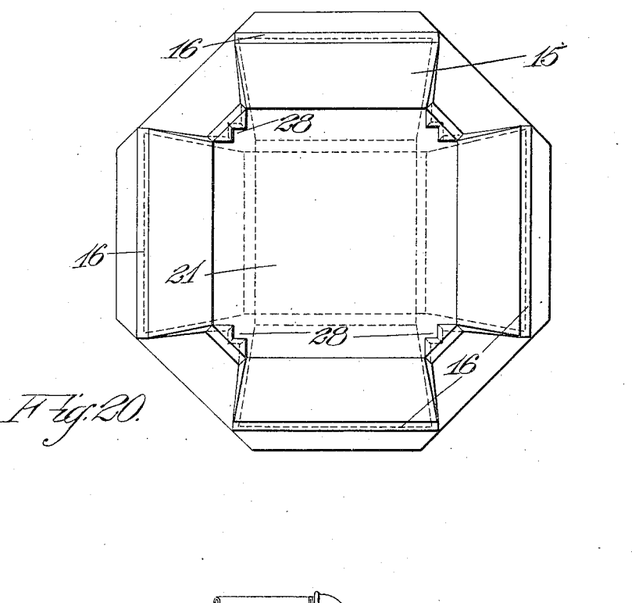
Fig. 20 is a plan view of one of the veneer holders.
Figure 21:
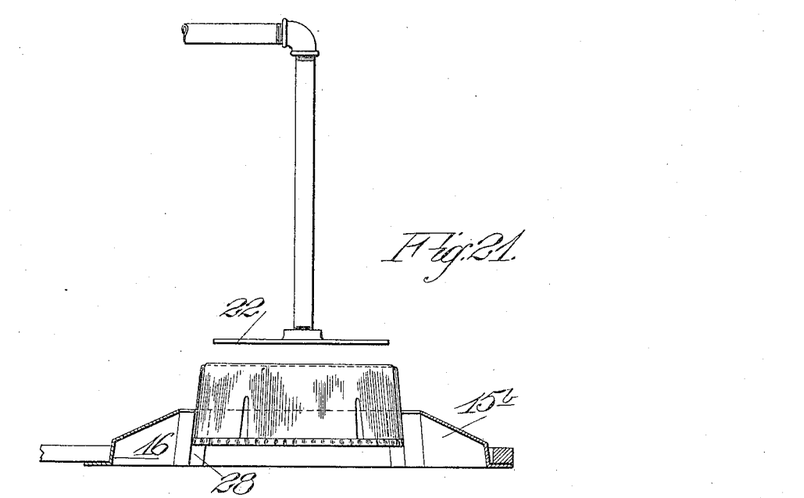
Fig. 21 is a section of a holder showing a finished basket supported therein, ready to be discharged by the ejector.

When the vertical slide 4 moves downward, the frame 18 through its rigid connection with the slide, will be moved in unison therewith. As the slide and frame 18 are depressed, the shoe 17 is brought into contact with the topmost veneer of a pile conveniently located as shown at 20, the continuous downward movement of the frame causes the pins $17^a$ to enter the veneer so that on the upward return movement of the frame, the topmost veneer will be lifted with the shoe, and as the shoe passes through the holder 15, the ends of the veneer catch upon the tapering side 16 thereof until the friction becomes so great that the pins on the shoe pull out of the veneer, and the veneer is left in the holder. The upward and downward movement of the frame 18 corresponds with one revolution of the main shaft. The table is then acted upon by the eccentric 13, and lever connections through the clutch 9, to revolve the table one-quarter of a revolution. This brings the holder in position over the next pile of veneer. The frame 18 is then again depressed, and another set of shoes $17^b$ pick up the second veneer from a second pile which is located in the path of travel of the shoe as at $20^a$, and in such position that the second veneer will stand transversely to the one first placed, as shown at 21, Fig. 13. Another quarter of a revolution of a table, brings the holder containing the two veneers in position over the mold A. The downward movement of the rectangular frame B then forces the veneers out of the holder, and bends them over the sides of the mold, thus forming the rectangular tapering basket. The upward movement of the rectangular frame releases the depressed plate 2 upon the top of the mold A; this lifts the finished basket off the mold; the metal binding strips having been meanwhile applied, as will be hereafter described. The spring-pressed sides of the frame then grip the sides of the basket, and lift it up through the holder $15^b$ until the corners of the basket are gripped by the tapering corners 28 of the holder, as shown in Figs. 20, 21. When the friction becomes too great, the spring-pressed sides of the frame, let go of the basket and leave it in the holder above the mold. Another quarter of a revolution brings the holder containing the finished basket to a position where it is discharged. 22 is a plate supported from one of the arms of the frame 18. A further downward movement of the frame carries the plate 22 downwardly so as to strike the top of the finished basket, and force it out of the holder. The basket may then be conveyed from the machine by any suitable means, such as a belt, chute, or some equivalent therefor.

It will be understood that each depression of the frame 18 corresponds to one revolution of the main shaft, and all four holders are under operation at the same time; holder 15 receiving the first veneer, holder $15^a$ receiving the second veneer, in holder $15^b$ the basket is being formed, and in holder $15^c$ a finished basket is being ejected.

On the main shaft 14 is a cam $28^a$. The revolution of the shaft causes the cam to act through a connecting rod 24 upon the fulcrumed tilting lever 23 which is connected with the slide 4. This slide carries the frame B and connected parts by which the veneers are folded, and also acts upon the frame 18 through its rigid connection 19 with the slide 4.

The mechanism for advancing the strips of metal 30 is described as follows: Mounted upon the shaft 14 is a cam 31. Extending from this cam is a connecting rod 32, the opposite end of which is connected to a crank arm 33 upon the shaft 34. This shaft is supported upon the main frame C as shown at 35; and through a suitable crank and link 36 it is connected to the pivoted lever 37. Through each revolution of the main shaft 14, and the above named connections, the lever 37 is oscillated once to every revolution. The lever 37 is connected to a slidable frame 38. Through this slidable frame the strips of metal are periodically advanced on each side of the upper frame. On each side of the vertical frame C' are two vertical guides 39. These guides are adapted to receive the binding strips of metal. The slidable frame lies directly under the vertical guides 39. In the V-shaped groove of the slidable frame 38 is a depression $30^a$ which corresponds with the thickness of one of the metal binding strips. When this depression passes under the vertical guides 39, the lowermost strip will drop into the depression, and will be carried out with the slidable frame. On the return movement of the frame, the strip is prevented from being drawn back with the slide by suitable stops 40—40'. The forward movement of the slidable frame 38 takes place at the same time that the previously deposited strips are being crimped on the edges of the basket. The stops 40—40' are mounted on a plate $40^a$. The plate in turn is provided with the stop $40^b$, and is subjected to a vertical upward movement at the right time. On the back side of the frame B is a small lug 90. When the frame B is raised to its highest position, the lug 90 will engage a projecting arm $40^c$ on the plate $40^a$ and lift the plate and stops 40—40' out of the V-shaped groove of the slidable frame 38. At this moment the slidable frame moves ahead, and places the metal binding strip in position. On the return movement of the slidable frame, the plate $40^a$ with stops 40—40' will have returned to their normal lowered position, the stops 40—41 resting in the V-shaped groove of the slidable frame 38, preventing the return of the strips.

Figures 14, 15, 16:
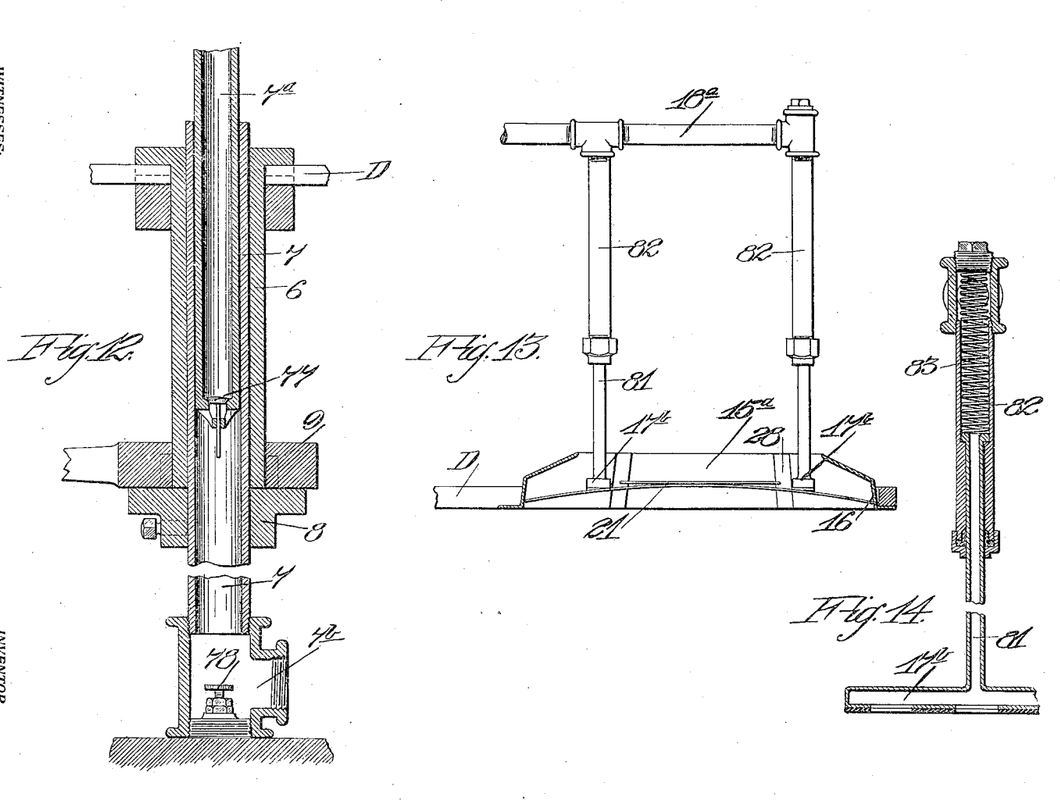
Fig. 14 is a section of the vacuum shoe and guide.
Fig. 15 is a cross section of the table portion of the main frame, showing the position of the snappers and connecting parts.
Fig. 16 is a similar section, showing the arms that support the metal strips.
Figure 15:
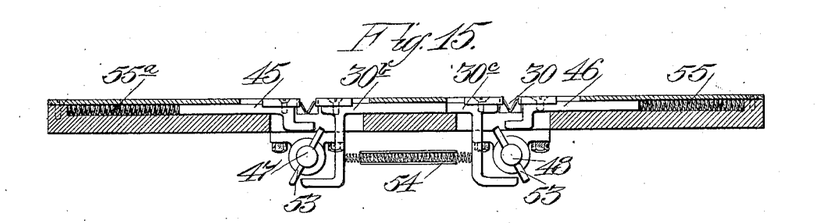
Figure 16:
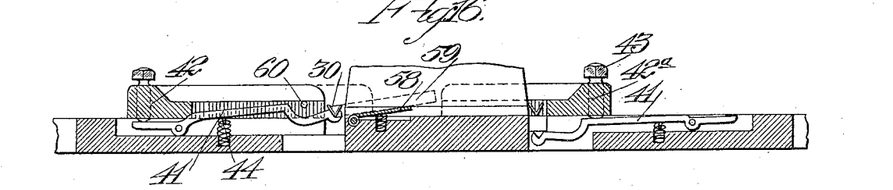
Figure 17:
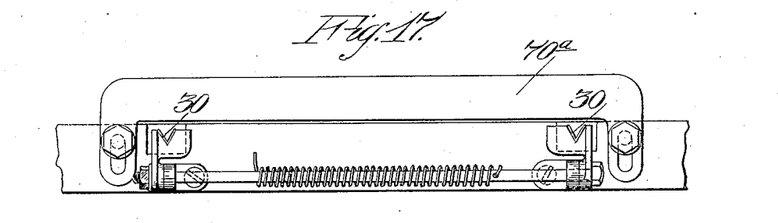
Fig. 17 is an end view showing the pivoted arms that help support the metal binding strips when in the raised position.
Figure 18:
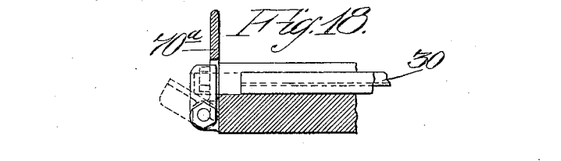
Fig. 18 is a side view of same.
Figure 19:
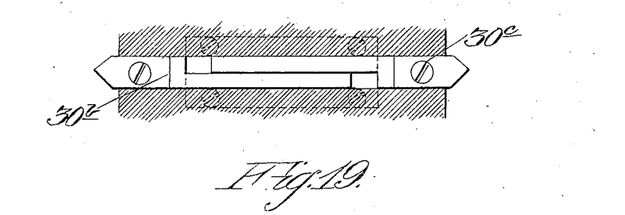
Fig. 19 is a plan view of the center snappers.

The strips are received on spring-pressed pivoted arms 41. These arms are in a depressed position as shown in Fig. 16 while the crimping takes place. The forward movement of the crimping yokes 42, which will be hereafter described, causes this depressed position of the arms 41. A set screw 43 mounted in the yoke rides over the arm, and depresses it.

When the yokes are retracted from the mold A, the spring shown at 44 forces the arm up, and holds the strip in line with the mold and in readiness to be folded around it.

45 and 46 are spring-actuated snaps, the function of which will be hereafter described.

Figure 8:
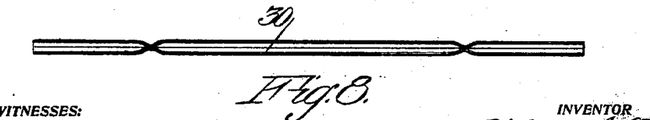
Fig. 8 shows a metal binding strip, bent by the snappers.

Before folding the strip around the mold, I have found it necessary to indent the strips at the point where the bend is to be made, as shown at Fig. 8. In practice I have found that when the strips are not indented, the forward movement of the yoke will not always bend the strips at right angles, but when indented as shown, satisfactory results can be relied on.

Figure 1:
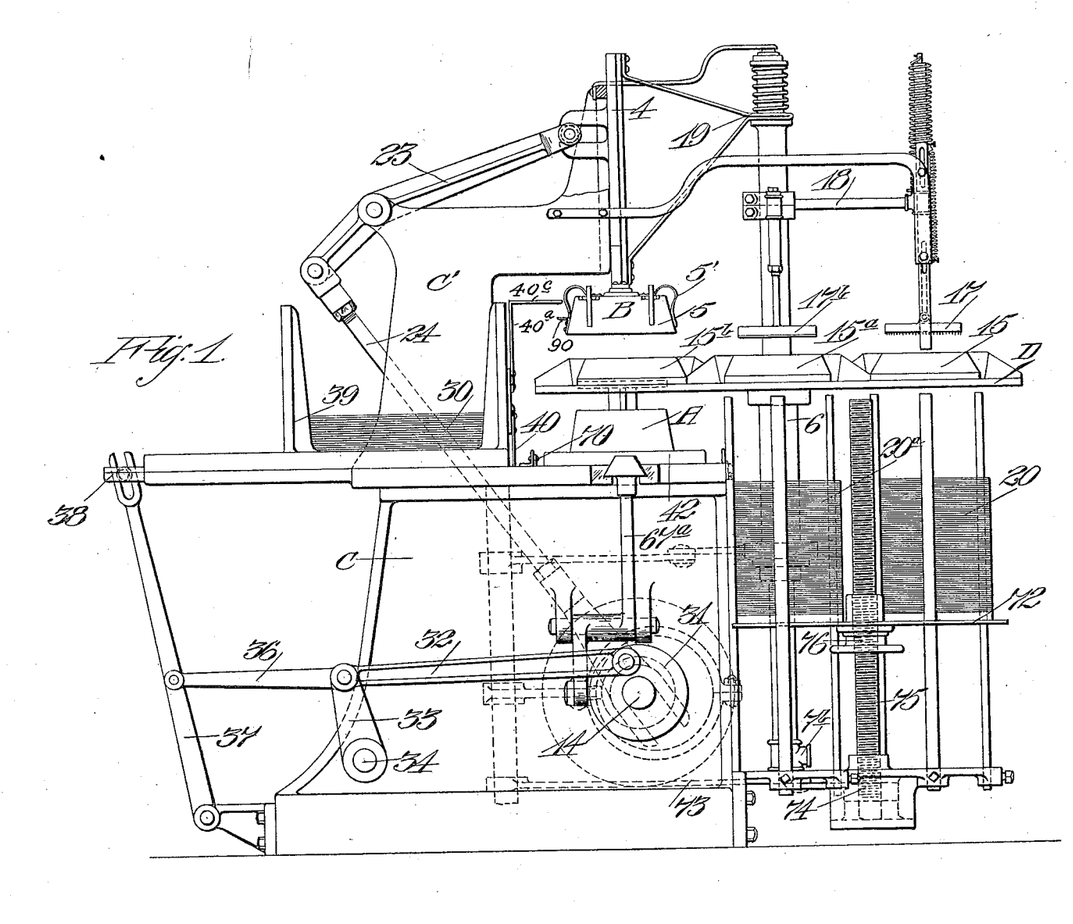
Figure 1 is a side elevation of my basket-making machine.
Figure 2:
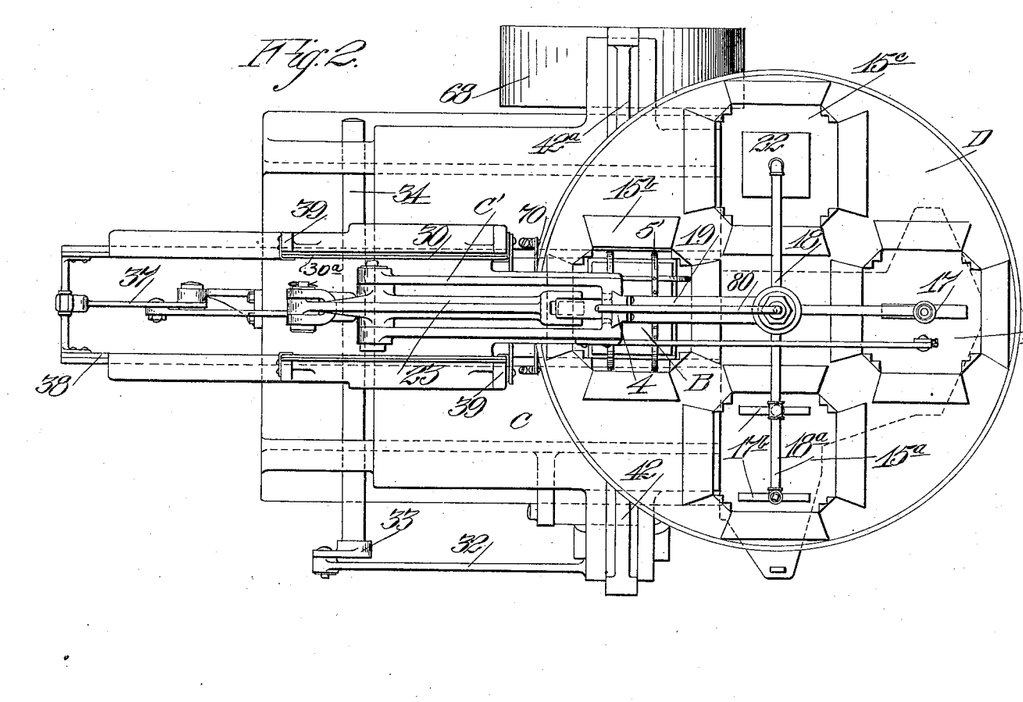
Fig. 2 is a plan view of same.
Figure 3:
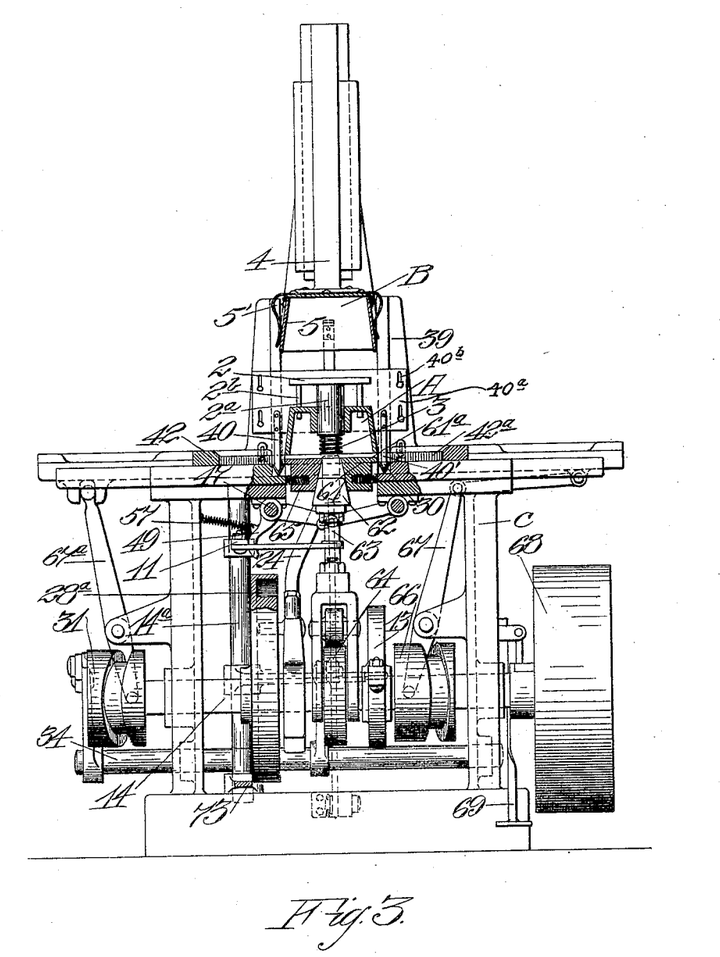
Fig. 3 is an end view, parts being removed to expose the machinery.
Figure 4:
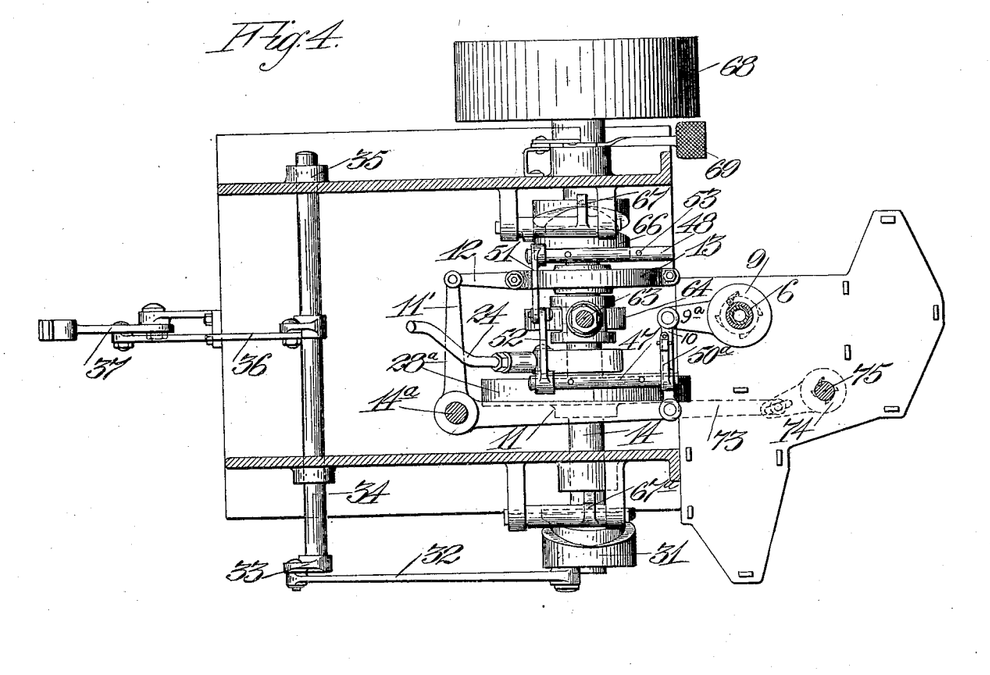
Fig. 4 is a plan view showing the main part of the driving mechanism.
Figure 5:
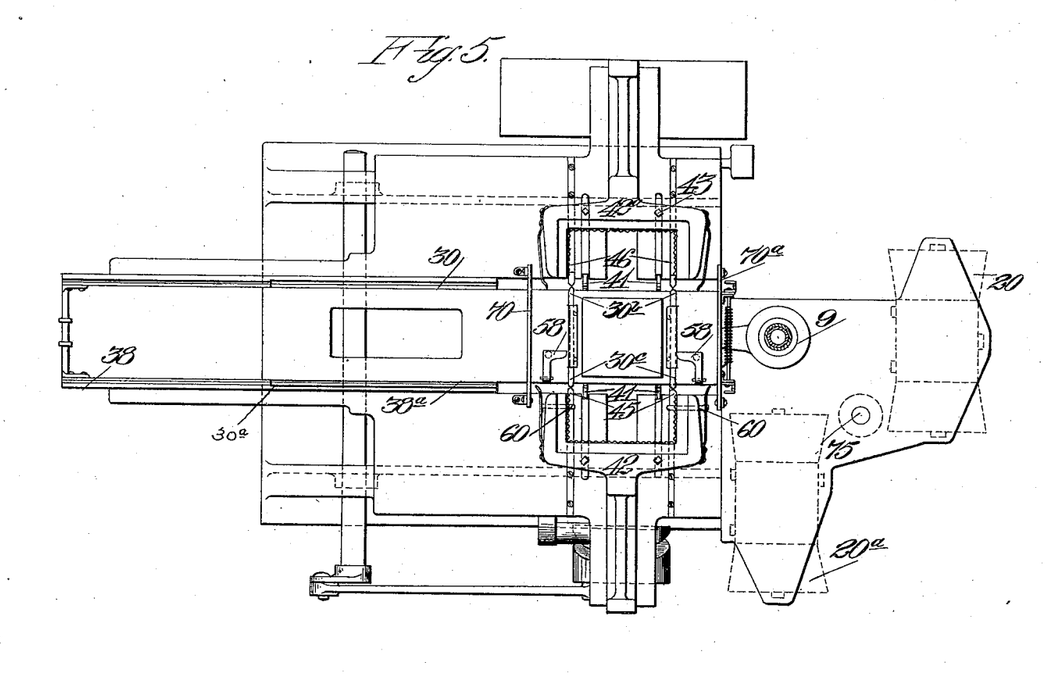
Fig. 5 is a plan view, above the table, showing the tin feeding and crimping mechanism.
Figure 6:
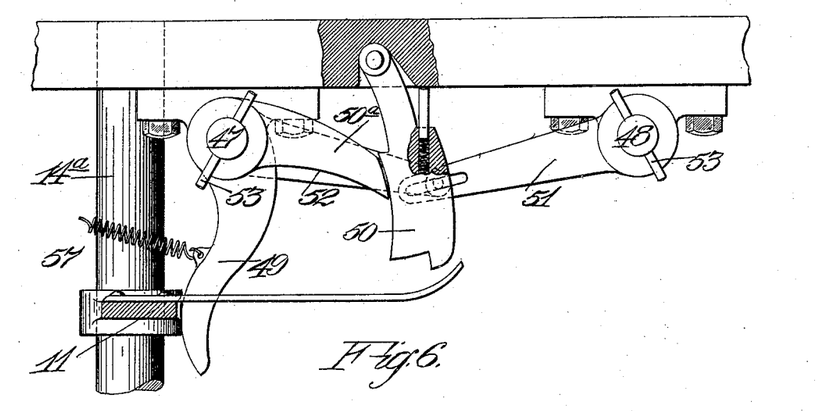
Fig. 6 is a detail view showing the tripping mechanism that controls the snappers.
Figure 7:
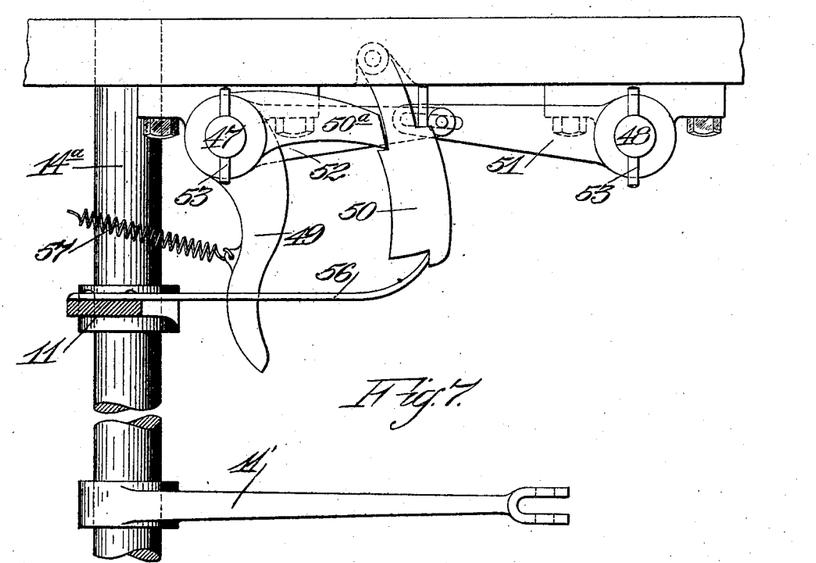
Fig. 7 shows another position of same.

Beneath the table portion of the main frame C are two parallel mounted shafts 47—48. These shafts will be oscillated at the proper time in the following manner: When the levers 11, $11^a$ on the shaft $14^a$ are rocked by the eccentric on the main shaft, lever 11 strikes a curved arm 49, and throws it to a position as shown in Fig. 7. A pawl $50^a$ on the shaft 47 catches in a notch in the pivoted arm 50. When the arm 11 is retracted, it leaves the shaft 47 and arm 49 in the position shown in Fig. 7. At the same time, when the shaft 47 is thus rocked, the shaft 48 will be simultaneously rocked through the action of the arms 51, 52.

On the shafts 47, 48 are pins 53. When the shafts are rocked, the lower part of the pins engage projections on the snaps $30^b$—$30^c$ and force the parts back against the compression of the spring 54; at the same time the upper part of the pins engage the projections 45 and 46 on the snaps, and force these back against the compression of the springs 55, $55^a$.

As already described, when the shafts 47 and 48 have been rocked to their full extent, the pawl $50^a$ is engaged in a notch of the arm 50, and held in this position until released.

Secured to the arm 11 is a tripping arm 56. When the arm 11 is again moved forward, the tripping arm engages the lower part of the member 50 and releases the pawl $50^a$. When the pawl is thus released a spring 57 retracts the bent arm 49 and releases the connecting levers. The projection of the parts $30^b$, $30^c$, and 45—46 which I have called snaps, being released by the pins 53 are forced quickly outward by their respective springs, the front ends strike the V-shaped metal strips, and thus compress them transversely and close the sides together at this point. The binding strips supported in their V-shaped guides on the ends of the levers 41, having thus been compressed by the spring action of the parts before described, are now ready to be folded around the mold A.

The folding device consists of two opposed rectangular yokes 42, $42^a$. These yokes are slidable in guides transversely with relation to the table and mold. The ends of these yokes striking the projecting ends of the binding strips, will fold them simultaneously about the back and front sides of the mold. These strips are sufficiently long to overlap where they meet, and when subsequently crimped these overlapping parts will be interlocked.

In order to properly overlap the V-shaped binding strips I have shown spring-pressed plates 58 located on each side of the mold. On the inward movement of the yokes, the ends of the same will catch the strip and fold it around the mold, and the part of the strips located in the ends of the spring-pressed plates 58 will ride up the inclined surface of the plate, and will stand in the position shown at 59, Fig. 16; while the end of the strip which is being bent in from the opposite side of the mold, will be folded straight around, and will lie beneath the upraised end shown at 59. The continued movement of the yokes will cause the pin 60 to depress the plate 58 and up-raised end 59 of the upper strip, and this will compress the V-formed upper strip into the correspondingly formed lower strip. In this condition the strips are ready to receive the downwardly folded ends of the veneers which have already been formed over the mold, and in position so that their downward movement will cause the edges to enter the strips in readiness for the latter to be crimped upon them.

The crimping is effected as follows: 61 are separable plates having the edges $61^a$ corresponding with the four sides of the mold A, and lying just beneath them. The binding strips inclose these edges and the edges of the basket when the latter are forced into the binding strips, and are also in line with the outwardly moving plates 61.

62 is a wedge-shaped block carried by the stem 63, and actuated by a cam 64, so that when the block 62 is forced upward by the cam, its four sides contact with the four separable plates 61, and it will thus be seen that these parts will be simultaneously forced outward, and the edges $61^a$ will act to compress and crimp the binding strips upon the edges of the basket veneers.

The inner surface of the yokes may be corrugated, or otherwise formed with indentations or irregularities, which will indent the binding strips into the material of the basket, and thus prevent accidental separation after the basket has been completed. When the wedge-shaped block is retracted, the four sides are forced back to their normal position by springs 65.

On the shaft 14 are cams 66, 31. These act through fulcrumed levers 67 and $67^a$ to advance and retract the yokes for the purpose already described.

The whole mechanism may be driven in any suitable manner: I have here shown the power applied to a belt pulley 68 upon the shaft 14. The power may be engaged or disengaged by any suitable clutch mechanism through a foot-treadle mechanism as at 69.

70 and $70^a$ are bars which lie upon the top of the binding strips when these are supported on the arms 41 so as to hold the binding-strips in place when they are in this depressed position. The two piles of veneers from which the supply is taken and placed in the holders, are supported on the table 72 which is raised so as to keep the top of the pile in proper relation with the shoes $17-17^a$.

On the lower part of the shaft $14^a$ is a lever arm 73. When the shaft $14^a$ is rocked through its connection with the eccentric 13, it acts to partly revolve a clutch 74 on the end of the worm shaft 75. At each revolution of the main shaft 14, the arm 73 is rocked, and the worm-shaft 75 is given a partial revolution. The worm acts on a nut 76 to raise the table and maintain the top of the veneer at the proper level.

In this apparatus I have shown two ways of placing the veneers in the holders 15. As before described the frame 18 is supported on a hollow tube $7^a$. This tube is slidable within the stationary tube 7, and this tube 7 may be connected as at $7^b$ with any suitable air exhausting apparatus. The arm $18^a$ supporting the two shoes $17^b$ is a hollow tube connecting with the tube $7^a$. In the bottom of the tube $7^a$ I have shown a suitable check valve as at 77, and when the frame 18 and the tube $7^a$ are forced down, the stem of the valve 77 strikes a set screw 78. This opens the valve and produces a vacuum in the tube $7^a$, and the tube $18^a$ and the shoes $17^b$. The shoes $17^b$ will at that time rest on the topmost veneer of the pile $20^a$. The vacuum having been produced, and the frame beginning its upward movement, the topmost veneer will adhere to the shoe and be lifted by it.

In the top of the tube $7^a$ I have shown a relief valve 79. When the shoes $17^b$ have reached a point where the veneer is ready to be deposited in the holder, the stem of the valve 79 strikes a stationary stop 80. This admits the exterior air and relieves the vacuum, thus allowing the veneer to be deposited in the holder 15.

Fig. 14 shows a section of the vacuum shoe $17^b$, and its holder. I have here shown the shoe mounted on a hollow stem 81. This stem is slidable within the holder 82 which is fixed to the arm $18^a$. The spring 83 normally holds the stem in position, shown in Fig. 14; in cases where the pile of veneers might be set too high, or if for other purposes it is desirable that the shoe $17^b$ have a yielding construction. The shoe 17 having projecting pins is also mounted on a similar stem as at 84. This stem is slidable through a tube 85, and is also held in position by the spring 86 which provides for the yielding action previously described.

It should be understood that under certain conditions it may be desirable to use the vacuum and the pin lifting devices in the same combination.

Having thus described my invention, what I claim and desire to secure by Letters Patent is—

1. In a basket-forming machine, a former-block and reciprocating folder co-acting therewith, a rotary table having a plurality of holders, said table being revoluble to intermittently advance said holders, veneers piled in line beneath the stop positions of the holders, and means by which the veneers are successively lifted from the top of the piles and fixed within the holders.

2. In a basket-forming machine, a fixed mold-block and a reciprocating folder, a revoluble table having a plurality of holders carried around its periphery, magazines located in line beneath the table within which the basket-forming veneers are piled, mechanism by which the table is revolved to bring each holder successively above one veneer magazine, means by which a single veneer is lifted from the top of the first pile and secured within the holder, means for subsequently advancing the table to place said holder above the second magazine, means acting to place another veneer in the holder and transversely to the first named veneer, means for disengaging the lifting device, and advancing the holder to position the veneers upon the former to be folded, said carrier being again advanced after the basket is formed, and means for discharging the basket at the last position of the carrier.

3. The combination in a basket-forming machine, of a former and folding device, a rotary table with a plurality of veneer holders, veneer magazines located beneath the path of travel of the holders, and positioned with relation to said table, means by which the table is successively advanced and stopped above each of the magazines, the former and a discharge position, respectively, means by which the veneers are successively lifted into the holders, said means including a vertically reciprocating lifter to which the top veneer in each magazine successively adheres, and by which said veneers are lifted into position within the holders, and means within the holders whereby the veneers are retained while being advanced to the former.

4. In a basket-forming machine, and in combination with a vertically reciprocating former, intermittently revoluble holders, veneer-containing magazines located beneath the path of travel of the holders and in line with which, with the former, and with a discharge, the holders are successively arrested, lifters positioned in line above the magazines, means for reciprocating said lifters into contact with the uppermost veneer in each magazine successively, and lifting the veneers into the holders, said holders having angular formations whereby the veneers are held in position by elastic tension.

5. In a basket-forming machine of the character described, a former, a table, with a plurality of veneer-holders, veneer magazines located at right angles with each other and beneath the path of travel of the holders, means by which the holders are advanced and arrested successively in line above each of the magazines and with the former and a discharge position, vertically reciprocating lifters in line with the magazines, means for depressing said lifters to pick up the topmost veneer from each magazine successively, and withdraw it into the holder, said holder having inclined sides whereby the ends of the veneers are compressed so as to be retained in the holders while being advanced to the former, said formers also acting to lift the completed basket from the holder and advance it to the discharge position.

6. In a basket-forming apparatus of the character described, a former, a plurality of revoluble holders, veneer-containing magazines located beneath the path of travel of the holders, lifters vertically reciprocable in line with the magazines and having the lower ends adapted to pick up the topmost veneer from each magazine, said holder having inclined sides between which the ends of the veneers are compressed and held in place so that the further movement of the lifters will disengage them from the veneers.

7. In a basket-forming apparatus of the character described, a stationary forming mold, a vertically reciprocating former having hinged spring-pressed sides capable of folding veneers over the mold-block holders, and a feeding mechanism by which said veneers are first positioned in holders with relation to each other, then deposited upon the former-block to be folded, and to have the binding rim applied, said spring-pressed sides acting to lift the completed basket from the mold, a holder adapted to grip the basket while being lifted and hold it while advancing to a discharge position, and a vertically reciprocating discharge plate adapted to contact with the bottom of the completed basket and discharge it from its holder.

8. In an apparatus of the character described, a former, means for supplying veneers to be folded about said former, holders or magazines for V-shaped binding metal strips substantially parallel with the lower edge of the former, means for advancing said strips in pairs upon opposite sides of the former, means for flattening or compressing said strips at the folding angles, means for folding the strips to register with the lower edges of the basket, and means for interlocking the ends of the strips and compressing said strips upon the basket edges.

9. In a basket-forming machine of the character described, magazines adapted to contain V-shaped binding strips, mechanism by which these strips are advanced in pairs upon opposite sides of the former, stops by which the advanced strips are prevented from being retracted, pivoted arms upon which the strips are received and held in position, mechanism by which the strips are crimped to register with the angles of the former, and mechanism by which the crimped strips are afterward folded and interlocked.

10. In a basket making apparatus of the character described, a former about which veneers are folded, guides and advancing mechanism for V-shaped metal binding strips, depressible arms upon which the strips are supported, crimping devices and means to actuate said devices while the strips are in position, reciprocating folding arms adapted to engage and fold the strips about the former and in line with the crimped portions, and movable plates whereby the strips are compressed upon the edges of the basket.

11. In a basket making apparatus of the character described, veneer feeding and folding devices, means for advancing, crimping and folding metallic strips into position, and fitting said strips to the basket edges, and means for overlapping and compressing said strips upon the basket, said means including outwardly movable plates, a vertically movable wedge-shaped block and means to reciprocate it between the plates, and springs by which the plates are subsequently returned.

12. In a basket-making machine of the character described, a former and means to assemble, position and fold veneers, means for advancing metallic V-shaped binding strips upon opposite sides of the former, means to crimp said strips at the angles, means by which the ends of one strip are folded and raised to overlap and lie above the ends of the other strip, said means including spring-pressed inclined plates upon which one member of the overlapping strips is raised to lie above the other.

13. In a basket-making machine of the character described, a former and means to assemble, position and fold veneers, means for advancing metallic V-shaped binding strips upon opposite sides of the former, means to crimp said strips at the angles, means by which the ends of one strip are folded and raised to overlap and lie above the ends of the other strip, said means including spring-pressed inclined plates upon which one member of the overlapping strip is raised to lie above the other, and pins carried by the folding yoke acting to depress the raised member, and interlock the two strips.

In testimony whereof I have hereunto set my hand in presence of two subscribing witnesses.

WILLARD F. BARNES.

Witnesses:
 GEO. H. STRONG,
 JOHN P. SIMMONS.